R. BEUTTENMÜLLER.
MACHINE TOOL.
APPLICATION FILED FEB. 28, 1910.
998,273.
Patented July 18, 1911.
2 SHEETS—SHEET 2.
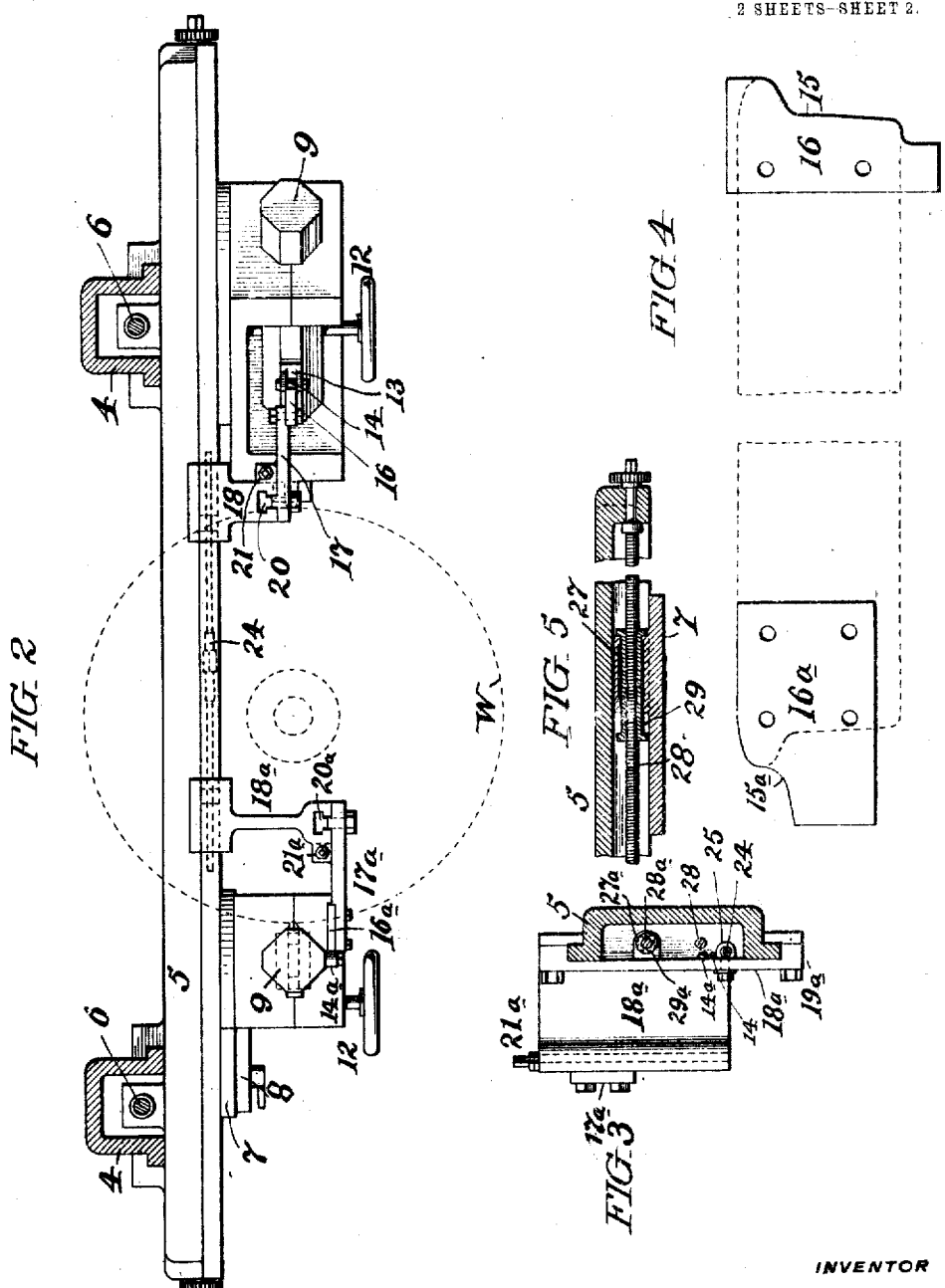

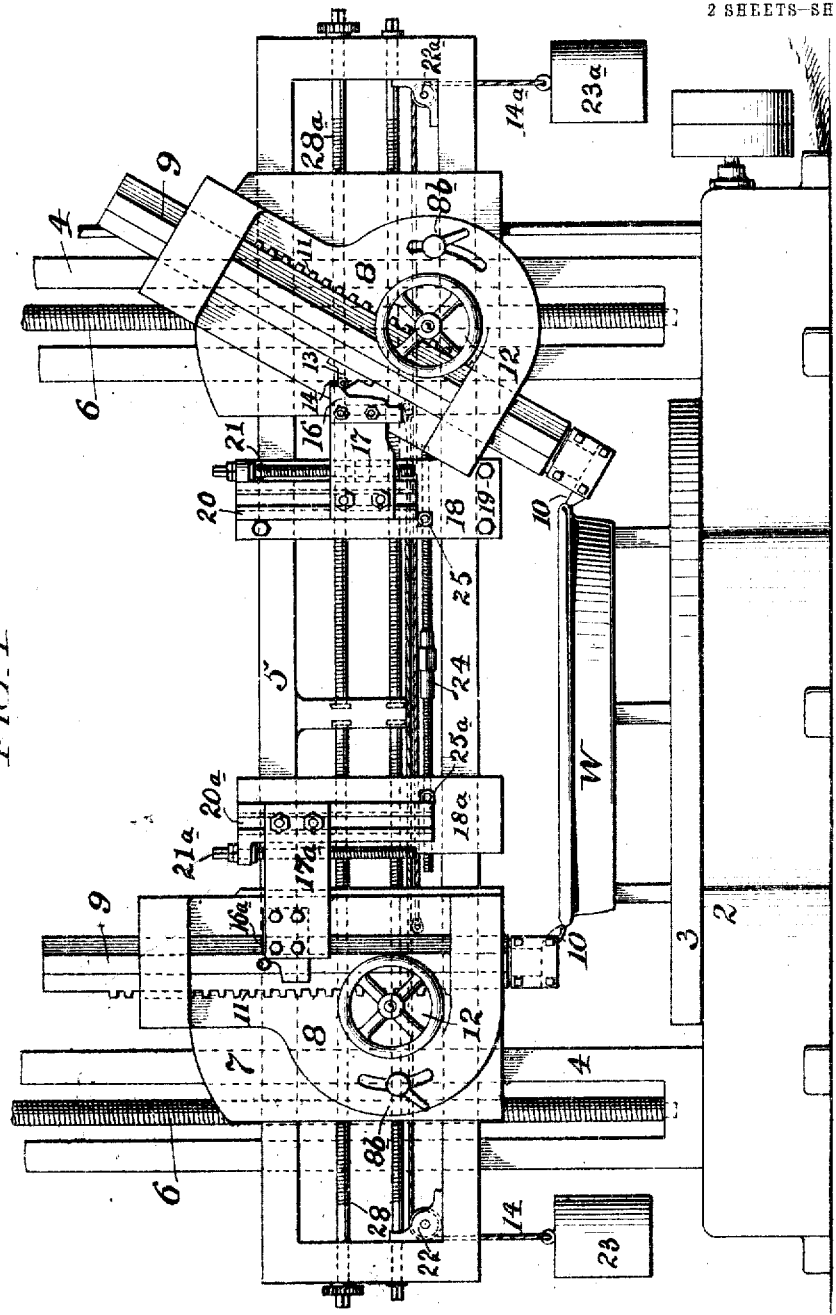

UNITED STATES PATENT OFFICE.

RUDOLF BEUTTENMÜLLER, OF PHILADELPHIA, PENNSYLVANIA.

MACHINE-TOOL.

998,273.     Specification of Letters Patent.     Patented July 18, 1911.

Application filed February 28, 1910. Serial No. 546,520.

*To all whom it may concern:*

Be it known that I, RUDOLF BEUTTENMÜLLER, a citizen of the United States, and a resident of the city and county of Philadelphia, State of Pennsylvania, have invented an Improvement in Machine-Tools, of which the following is a specification.

My invention has reference to machine tools and consists of certain improvements which are fully set forth in the following specification and shown in the accompanying drawings which form a part thereof.

The object of my invention is to provide a construction of turning-mill or lathe which shall be adapted for automatically turning the rim of car wheels, whereby the wheels may be turned to accurate gage and accomplished in a speedy and efficient manner without requiring any special skill or judgment on the part of the operator in charge of the machine.

In the preferred form of my invention my improvements are applied to that class of machines which are commonly called turning or boring mills, and having a horizontal turn-table rotated under suitable tool holders and feeding mechanism therefor, whereby the work is rotated against the tools, the machine as a whole constituting in effect a lathe with a horizontal face plate. While I prefer this character of machine for obvious reasons when operating upon heavy work, my invention may be employed in connection with lathes of any character.

In carrying out my invention, I provide the two tool holders of the mill with cutters arranged to operate upon different portions of the flange of the wheel, one tool to cut from the crown of the flange downwardly across the tread of the wheel, while the other cutter is adapted to cut from the crown of the wheel over the rim and rear face of the wheel adjacent to the flange portion, and with these cutters I combine former controlling devices which causes the cutting tools to be controlled in their movement so as to insure the cutting of the flange and tread portion only to the extent required and as dominated by the said templets or formers.

In the ordinary practice of my invention the cutting tools will be each controlled in one direction by the templet or formers, whereas other adjustments may be controlled by hand, or by suitable means independent of the former control. Furthermore, I prefer to connect the former devices so that they can be adjusted nearer or farther apart to suit the different diameters of the wheels, and also to provide means for causing the tool holders to be adjusted horizontally automatically under the control of the templets or formers during the vertical adjustment of said tool holders.

My invention consists of the improvements which are more fully described hereinafter and defined in the claims.

Referring to the drawings, Figure 1 is a front elevation of a wheel turning machine embodying my invention; Fig. 2 is a sectional plan view of the same; Fig. 3 is a cross section on line $x$—$x$ of Fig. 1; Fig. 4 is a diagrammatic view indicating the relation of the templets to the portions of the wheels which are to be turned; and Fig. 5 is a sectional plan view of means for adjusting the tool slide.

2 is the main frame of the machine, and is provided with the usual rotating turntable 3, which may be rotated in any suitable manner. The main frame is further provided with the usual upright guides 4 upon which the horizontal tool holding frame is vertically guided and whose position vertically may be adjusted by the usual screws 6. Upon the horizontal guide 5 are two slide plates 7 which may be respectively adjusted horizontally along the guide frame 5 by screws 28 and 28ª. Each of these plates 7 has pivoted upon it tool holding frames 8 which may be adjusted to different angles in a vertical plane and clamped by clamps 8ᵇ. These tool holding frames are provided with tool holders 9 having the cutting tools 10 clamped in position at the bottom, and further being provided with a rack 11, which, by means of the usual hand wheel and connecting gearing 12 may be employed to adjust the tool holder 9 in a more or less vertical direction upon the tool holding frame.

All of the mechanism so far described may be considered as common to any boring or turning mill.

I will now describe the mechanism for automatically controlling the horizontal operation of the tools and tool holders, and while this mechanism is substantially similar with respect to each of the two tool holders, it is adapted to cause the said tool holders to operate independently under the control of separate templets or formers.

Referring to the right hand tool holder in Fig. 1, namely, that which is intended to turn the wheel rim from the crown of the flange across the tread of the wheel, the tool holder 9 is provided with a frame 13 bolted to the said tool holder and carrying a roller 14. This roller 14 works against the face 15 of the templet 16, and said templet 16 is detachably secured to a rim 17 which is adjustable upon a block 18 in a vertical direction, the said block 18 being clamped upon the horizontal guide frame 5 by means of bolts 19. The arm 17 is guided in vertical guides 20 in the frame 18 and is adjusted vertically therein by means of an adjusting screw 21 carried by said frame 18 and working through a screw-threaded aperture in the arm 17. By means of this adjusting mechanism, the vertical position of the former supporting arm may be adjusted and secured. The tool holder mechanism is caused to be moved horizontally by means of a cable 14 extending from the pivoted tool holding slide 18 to the distant end of the horizontal guide frame 5 where it passes over a pulley 22 and connects with an operating weight 23. From this mechanism it will be understood that if the tool holder 9 be adjusted from a position downward, the roller 14 will follow the edge 15 of the former 16 and cause the tool 10 to be adjusted horizontally to a greater or less extent, so that its cutting position corresponds exactly to the former for every position of vertical adjustment. In this manner the rotation of the work against the tool 10 during the vertical adjustment of the tool holder and tool will cause the work to be turned in exact accordance to the shape of the former edge 15. The work in the particular illustration is shown as a car wheel, and the cutter and mechanism just described is arranged to operate to turn the outer working face of the car wheel from the crown of the flange across the tread portion.

The left hand tool holding and adjusting mechanism is similar to that above described, but is intended to operate in the opposite direction, so that while the right hand cutter is operating upon one part of the wheel, the other cutter will be operating upon the diametrically opposite part of the wheel, but the coöperation of these cutters will preferably be such that the turning of the two parts, namely, above and below the crown of the flange of the wheel will be accomplished simultaneously, and so coöperate that where the turning of one cutter leaves off the other begins. In connection with the left hand cutter, the tool holder is provided with a roller 14ª similar to roller 14, which works in connection with a former 16ª having a working face 15ª. This former 16ª is bolted to an arm 17ª which in turn is guided in vertical guide slots 20ª upon a block 18ª and which adjustment is secured by an adjusting screw 21ª. The frame or plate 18ª is bolted upon the horizontal guide frame 5, as in the case of the block 18. In the adjustment of the left hand tool holder it is arranged vertical or its angle to a vertical line may be the reverse of the tool holder at the right hand side of the machine, because in this case it is required to perform the cutting operation over the upper edge of the rim and flange. The two frames 18 and 18ª may be connected together by means of an adjustable connecting rod 24 having right and left handed screw-threaded ends which engage the respective nuts 25 and 25ª on the blocks 18 and 18ª. By means of this connecting rod the relative lateral positions of the two formers may be varied and definitely fixed, the said adjustments being to insure the formers being accurately spaced apart to satisfy the different diameters of the wheels to be turned. After the adjustment of the formers relatively to each other is secured by means of the connecting rod 24, the said frames 18 and 18ª are positioned and secured upon the horizontal guide frame 5 and remain in such positions throughout the use of the tool in the repeated turning of successive wheels of the same diameter. The tool holder for the left hand cutter is caused to be adjusted horizontally to remain in contact with the guiding edge 15ª of the former 16ª by means of a cable 14ª passing over a pulley 22ª and supporting an operating weight 23ª, corresponding to the similar appliances employed in connection with the right hand tool holder, but operating in the reverse direction. To enable adjustment of the slides 7 upon the guide frame 5 by the screw shafts 28 and 28ª, I may provide the said slides with suitable means of any kind which will temporarily engage the screw shafts such as have been employed in machine tools, but in the construction shown I have a square spool 29 threaded upon the screw shaft and sliding in the lug bearing 27 on the back of the slide 7 as shown in Figs. 3 and 5, the bearing 27 and slide 7 having freedom of play upon the spool. To adjust the slide it is only necessary to rotate its screw shaft 28 or 28ª until the head of the spool strikes the end of the bearing 27, after which a further rotation of the shaft will move the slide. When the slide is properly positioned in relation to the work, the spool is readjusted so as to give the slide all the freedom of play necessary, the amount of which is dependent upon the horizontal travel of the slide and tool holder under the control of the formers 16 and 16ª. Any other means than that shown may be employed for adjusting the slides preliminary to their automatic movements under the control of the formers.

My invention may be applied to various commercial types and turning mills and lathes, and I therefore do not restrict myself to any particular form of such machines, nor to the combined use of the two tool holders and formers controlling devices, as either of the said devices may be used separately.

While I prefer the construction herein set out, I do not limit myself to the details thereof, as they may be modified in various ways without departing from the spirit of my invention.

Having now described my invention, what I claim as new and desire to secure by Letters Patent, is:—

1. In a machine tool for turning wheels, etc., the combination of a rotating part upon which the work is secured and by which it is rotated, a guide frame substantially parallel to the plane of rotation of the rotating part, a sliding frame adjustable upon the guide frame, an adjustable tool holder carried by said sliding frame and provided with a laterally extending cutting tool, a former fixedly located relative to the guide frame and having an operating edge corresponding to the shape to be turned upon the work and directed toward the sliding frame, guiding means upon the tool holder resting upon the guiding edge of the former for controlling the adjustment to the sliding frame, means for adjusting the tool holder in the direction of its length upon the sliding frame and thereby varying the position of the means on the tool holder in contact with the former and imparting adjustment to the sliding frame, and means to automatically retain the guiding means on the tool holder in working contact with the guiding edge of the former.

2. In a machine tool for turning wheels, etc., the combination of a rotating part upon which the work is secured and by which it is rotated, a guide frame substantially parallel to the plane of rotation of the rotating part, a sliding frame adjustable upon the guide frame, an adjustable tool holder carried by said sliding frame and provided with a laterally extending cutting tool, a former fixedly located relative to and supported by the guide frame and having an operating edge corresponding to the shape to be turned upon the work, means for adjusting the former upon the guide frame and transversely to the length thereof, guiding means upon the tool holder resting upon the guiding edge of the former, means for adjusting the tool holder in the direction of its length upon the sliding frame and thereby varying the position of the means on the tool holder in contact with the former and imparting corresponding adjustment to the sliding frame, and means to automatically retain the guiding means on the tool holder in working contact with the guiding edge of the former.

3. In a machine tool for turning wheels, etc., the combination of a rotating part upon which the work is secured and by which it is rotated, a guide frame substantially parallel to the plane of rotation of the rotating part, a freely movable sliding frame adjustable upon the guide frame, an adjustable tool holder carried wholly by said sliding frame and provided with a rigidly secured laterally extending cutting tool, a former fixedly located upon the guide frame and having an operating edge corresponding to the shape to be turned upon the work, means for adjusting the former longitudinally upon the guiding frame, guiding means upon the tool holder resting upon the guiding edge of the former for controlling the sliding frame, means for adjusting the tool holder in the direction of its length upon the sliding frame and thereby varying the means on the tool holder with respect to its position of contact with the former, and means to automatically retain the guiding means on the tool holder in working contact with the guiding edge of the former.

4. In a machine tool for turning wheels, etc., the combination of a rotating part upon which the work is secured and by which it is rotated, a guide frame substantially parallel to the plane of rotation of the rotating part, a freely movable sliding frame adjustable upon the guide frame, an adjustable tool holder carried wholly by said sliding frame and provided with a rigidly secured laterally extending cutting tool, a former fixedly located relative to the guide frame and having an operating edge corresponding to the shape to be turned upon the work, means for adjusting the tool holder into different angular positions upon the sliding frame and to different positions upon the guide frame in the direction of its length, means for adjusting the former lengthwise and transversely with respect to the guide frame, guiding means upon and movable with the tool holder resting upon the guiding edge of the former, means for adjusting the tool holder in the direction of its length upon the sliding frame and thereby varying the means on the tool holder with respect to its position of contact with the former, and means to automatically retain the guiding means on the tool holder in working contact with the guiding edge of the former.

5. In a machine tool for turning wheels, etc., a rotating turn-table, combined with a horizontal guide frame, two slide frames freely adjustable toward each other upon the same horizontal guide frame and arranged at opposite sides of the center of the turn-table, tool holders on the adjustable slide frames and wholly supported and movable therewith, adjusting means for changing the angle of movement of the tool holders relatively to the turn-table, and two separate formers for respectively simultaneously guiding the lateral adjustments of the sliding frames and the tool holders, and means for adjusting the two formers relatively nearer or farther apart and fixedly holding them with respect to the horizontal frame.

6. In a machine tool for turning wheels, etc., a rotating turn-table, combined with a horizontal guide frame, two slide frames freely adjustable toward each other upon the same horizontal guide frame and arranged at opposite sides of the center of the turn-table, tool holders on the adjustable slide frames and wholly supported and movable therewith, adjusting means for changing the angle of movement of the tool holders relatively to the turn-table, and two separate formers for respectively simultaneously guiding the lateral adjustments of the sliding frames and the tool holders, means for adjusting the two formers relatively nearer or farther apart and fixedly holding them with respect to the horizontal frame, and means for independently adjusting the formers vertically relatively to each other and to the horizontal frame.

7. In a turning mill, the combination of the rotating turn-table, with two independently adjustable tool holders, one of which is arranged to be guided obliquely to and from the turn-table and the other adapted to be guided in substantially a vertical direction with respect to the turn-table, a separate former for each of the tool holders against which said tool holders are guided in their movements to and from the turn-table, means for adjusting the tool holders to and from the turn-table, and automatic means for adjusting the tool holders horizontally along the horizontal guide frame in contact with and under the control of the formers.

8. In a turning mill, the combination of a rotating turn-table, with two independently adjustable tool holders, one of which is arranged to be guided obliquely to and from the turn-table and the other adapted to be guided in substantially a vertical direction with respect to the turn-table, a separate former for each of the tool holders against which said tool holders are guided in their movements to and from the turn-table, means for adjusting the tool holders to and from the turn-table, and independent means for adjusting the two formers to or from the turn-table.

In testimony of which invention, I hereunto set my hand.

RUDOLF BEUTTENMÜLLER.

Witnesses:
R. M. HUNTER,
R. M. KELLY.